INVENTOR.
KENNETH K. ZEIGER
BY Alfred Stapler
ATTORNEY

United States Patent Office 3,271,762
Patented Sept. 6, 1966

---

3,271,762
ELECTRICAL SYSTEM
Kenneth K. Zeiger, Levittown, Pa., assignor to General Atronics Corporation, Wyndmoor, Pa., a corporation of Pennsylvania
Filed June 26, 1963, Ser. No. 290,832
14 Claims. (Cl. 343—7)

This invention relates to improvements in radar systems and particularly to improvements in systems employing scanning antennas whose scanning motion is predetermined and not subject to ready control in response to radar target information.

In a prior patent application, Serial No. 838,087, filed September 4, 1959, and assigned to the assignee of the present invention, there is disclosed an improved radar system employing a sub-system which is supplied with received radar return signals (including both noise- and target-representative portions) and compares these received signals with each of two different signal reference or threshold values. These threshold values are so chosen that returns which exceed the greater of them can be regarded with a statistically high degree of certainty as returns from targets, whereas returns which fall below the lesser of the threshold values can be similarly regarded as returns from regions containing no targets.

Since the returns from a single transmitted radar pulse, or "main bang," do not always all fall into the above-mentioned target and no-target categories, the sub-system in question is further capable of utilizing the returns from several different main bangs, collectively, in making the desired classification into target and no-target categories.

For convenient reference the subsystem characterized above will be referred to hereinafter as a "probability ratio sequential detector."

In accordance with the invention described in the above-identified prior application, Serial No. 838,087, the probability ratio sequential detector not only classifies the radar returns into target and no-target categories, but also controls the operation of the radar system as a whole so as to obtain controllable amounts of radar information from different regions in the space under radar surveillance, the amount of such information obtained from any given region depending upon the difficulty of performing the desired classification for all of the returns from that region.

A particular mode of control disclosed in the said prior application involves the direction of radar radiation and reception, which can be effected, for example, by controlling the orientation of the radar antenna.

In dealing with radar systems whose antennas follow a predetermined scanning program not susceptible of ready modification this mode of control is not conveniently applicable.

I have now devised another mode of control, which does not require modification of the predetermined antenna scanning program and which, nevertheless, permits the utilization of a probability ratio sequential detector to provide target and no-target classification in spite of variations in the degree of difficulty encountered in performing such classification.

Accordingly, it is a primary object of this invention to apply a probability ratio sequential detector to a radar system whose antenna scanning program is not readily modifiable.

It is another object of the invention to provide classification of radar returns into target and no-target categories in spite of variations in the difficulty of making such classification, and in a radar system whose antenna scanning program is fixed.

It is still another object to meet the object stated above in a manner which involves comparatively little equipment complexity.

These and other objects of the invention which will appear are achieved, in accordance with the present invention, by utilizing the probability ratio sequential detector to control, not the orientation of the radar antenna (as heretofore) but the number of radar pulses, or main bangs, which are transmitted from that antenna.

In practical radar systems, the relationship between the cross-section of the beam defined by the radar antenna radiation pattern and the repetition rate of the radar pulses transmitted from the antenna is such that even when the antenna is undergoing continuous scanning motion it can still be regarded as effectively stationary at a given orientation during the radiation of several transmitted pulses. The reason for this is that the radar system is inherently incapable of resolving objects which are smaller than the beam cross-section and, accordingly, until the antenna has moved through an arc corresponding to that subtended by that cross-section, the net effect on target detection is as though the antenna had not moved at all. During the period required to move through such an arc there are typically transmitted ten or more radar pulses and these can therefore all be considered to have been transmitted at the same *effective* antenna orientation.

By subjecting the radar returns from the transmitted pulses to the operation of the probability ratio sequential detector, I have found it to be normally possible, in the case of effective antenna orientations toward regions of space containing no targets, to make a decision to that effect using far fewer than the above-mentioned typical numbers of transmitted pulses. Moreover, in any practical case, the number of different effective antenna orientations at which no targets are present is very great compared to that at which targets are present. Consequently, in the vast majority of cases, the use of the probability ratio sequential detector will permit a decision (namely a no-target decision) to be made on the basis of a far smaller number of pulses than are normally transmitted at any given effective antenna orientation.

In accordance with this invention, the probability ratio sequential detector is employed to control the transmitted radar pulses by terminating the transmission of additional such pulses at any given effective antenna orientation as soon as either a target, or a no-target decision has been reached by the detector. Further, in accordance with the invention, the length of each transmitted pulse is increased, while maintaining the same peak power, beyond that pulse length which would normally be employed in a radar system having the same operating parameters but lacking a probability ratio sequential detector.

The increase in the length of the transmitted pulses increases the amount of power radiated in each pulse and this, in turn, increases the sensitivity of the radar system. Such an increase in pulse length becomes possible without exceeding the average-power capacity limits of the source of radiated energy (e.g. the transmitter magnetron) because the aforementioned capabilities of the probability ratio sequential detector permit the number of such pulses which have to be radiated at most effective antenna orientations to be greatly reduced. To put it another way, in conventional radars the pulse length is chosen so that the average-power capacity of the energy source is not exceeded by the number of pulses (e.g. ten or more) emitted at each effective antenna orientation. Due to the probability ratio sequential detector, a radar embodying my invention needs to emit, at most orientations, only a much lesser number of pulses (e.g. two or three). These can therefore be much longer without exceeding the average-power capacity of the source.

For further details reference may be had to the description which follows and to the accompanying drawings, wherein.

In both figures the same reference numerals designate similar parts.

Figure 1:
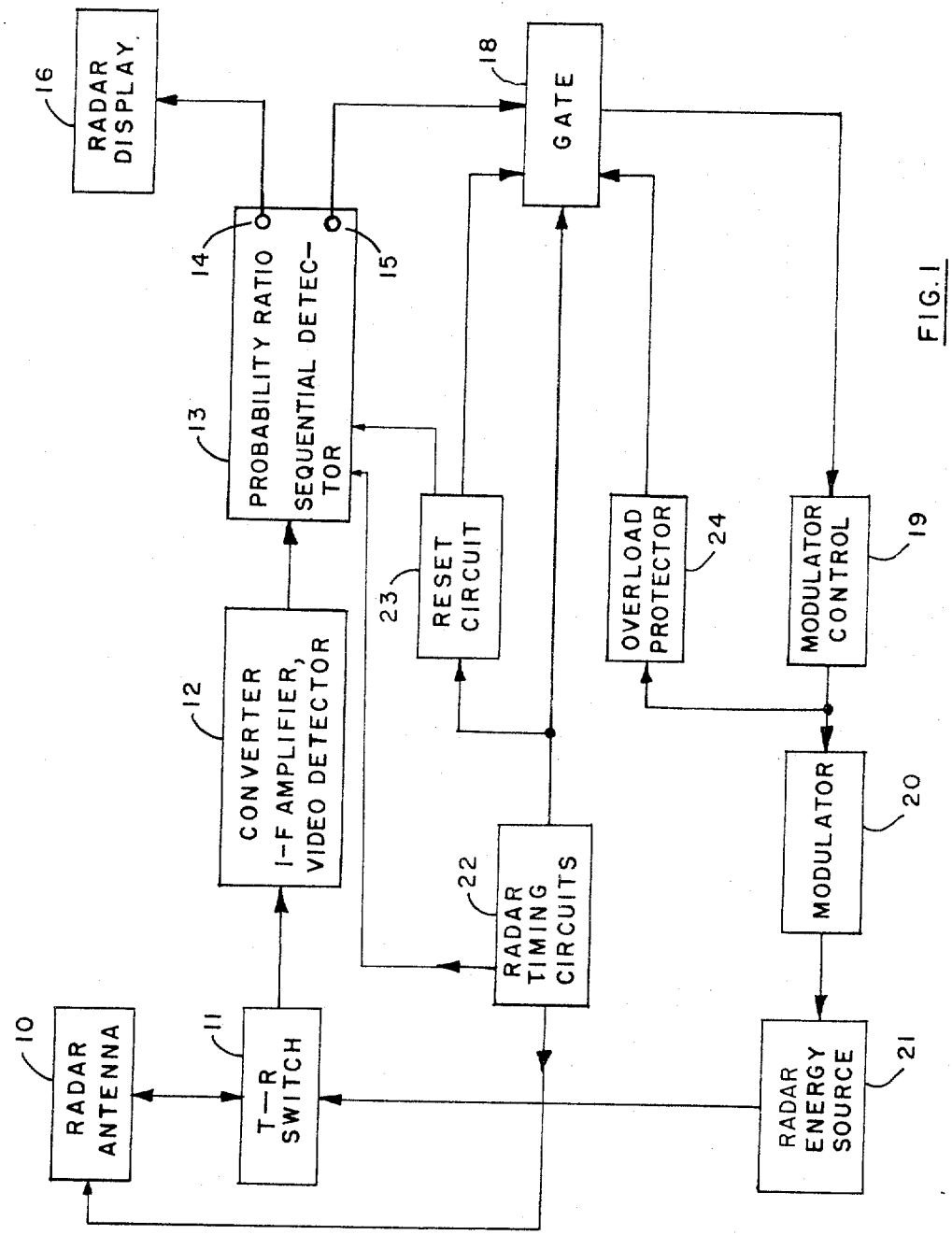
FIGURE 1 shows a simplified block diagram of the essential components of a radar system embodying the present invention.

Referring now to FIGURE 1, the radar system illustrated therein comprises an antenna 10, serving to transmit radar pulses and receive radar returns between successive transmissions, a transmit-receive, or "T-R" switch 11, through which the signal to be transmitted is supplied to the antenna and the radar returns derived therefrom, and converter, I-F amplifier and video detector circuitry 12 which is supplied with these returns and transforms them into suitably amplified signals of corresponding form and in the video frequency range. These video frequency signals from circuitry 12 are supplied to probability ratio sequential detector 13 which processes them in a manner more fully described hereinafter. The detector 13 produces, at its output 14, output signals only in response to such portions of the returns which are classified by the detector as representing one or more radar targets in the region of space under radar surveillance at a particular effective antenna orientation. Such signals are therefore called target signals. On the other hand, at its output 15 detector 13 produces an output signal only after all portions of the returns from the region under surveillance have been classified by the detector as representing either targets or no-targets.

The target signals, if any, from output 14 of detector 13 are supplied to a radar display device 16, where they serve to produce the usual visible target indications.

The signal from output 15 of detector 13 is supplied to gate circuit 18 whose output is, in turn, supplied to a modulator control circuit 19. The output of this control circuit is supplied to a modulator 20, whose output is supplied to a source of radar energy 21. The output from this energy source 21 is supplied to the T-R switch 11 for application to the antenna 10.

The system of FIGURE 1 further comprises timing circuitry 22 which controls the timing of the various operations performed by the system as explained more fully hereinafter. In addition, the system comprises reset circuitry 23 supplied with signals from the timing circuitry 22 and supplying in turn a control signal to gate circuit 18. The system also comprises an overload protector circuit 24 supplied with the output signal from modulator control circuit 19 and supplying a control signal to gate circuit 18.

The over-all operation of the system of FIGURE 1 will now be described, together with certain details concerning the construction and operation of its components.

The basic operation of the system is controlled by its timing circuitry 22. This circuitry provides a variety of sets of timing signals, all having a certain degree of periodicity of recurrence and all bearing certain relationships to each other, insofar as their times of occurrence are concerned.

Since neither the construction of this timing circuitry 22 nor the types of signals generated thereby differ from what is encountered in conventional radar systems, this circuitry is not further described herein. Rather, to avoid unnecessary detail, this discussion is limited to the use which is made of the signals produced by this circuitry.

One set of timing signals from circuitry 22 controls the scanning motion of the antenna 10. This is accomplished by applying these timing signals in conventional manner to conventional antenna steering mechanisms (not shown).

A second set of timing signals from circuitry 22 controls the emission of radar energy from source 21. This set of timing signals consists of pulses produced at a predetermined repetition rate, known as the pulse repetition frequency, or "PRF" of the radar system. The period of time which elapses between the commencement of one such timing pulse and the next—which period is equal to the reciprocal of the PRF—is known as a "sweep." This term therefore designates the period during which there is carried out one complete radar search operation, consisting first of the transmission of a radar pulse and thereafter of the reception of radar returns from various ranges in response to the transmitted pulse.

This set of timing pulses is supplied to gate circuit 18, which may be of any conventional form capable of assuming either a signal-transmissive of a signal non-transmissive state in response to control signals applied thereto. Timing pulses reaching gate circuit 18 when the latter is signal-transmissive or "open" are transmitted to modulator control circuit 19. This circuit 19 may take any conventional form, e.g. that of a thyratron trigger circuit, responsive to the leading edge of each applied timing pulse to produce a corresponding output pulse. This output pulse is supplied to modulator circuit 20 which may be of any conventional form, e.g. an inductance-capacitance pulse forming or stretching network, capable of transforming the pulses supplied from control circuit 19 into pulses of a length corresponding to the desired lengths of the pulses transmitted from antenna 10.

The output signal from the modulator 20 is then supplied to a conventional source of radar energy such as a klystron or magnetron, which responds thereto to emit pulses at corresponding intervals.

During the intervals between successive pulses from source 21, the T-R switch 11, which may also take any conventional form, establishes a path between radar antenna 10 and the circuits collectively represented by block 12 in FIGURE 1. These circuits include converter, intermediate frequency amplifier and video detector circuits of conventional form effective to transform the target and noise-representative modulations present on the high-frequency signals (if any) received by antenna 10 into video frequency signals of corresponding form, and suitably enhanced amplitude.

If these video signals were supplied directly to the radar display device 16, if the gate circuit 18 were always signal-transmissive to the timing signals from circuitry 22, and if the radar pulses transmitted under the control of circuits 19 and 20 were of conventional lengths, then a substantially conventional radar system would be present. However, these hypothetical conditions do not exist. On the contrary, in accordance with the present invention, each transmitted radar pulse is longer than normal, the signals from circuits 12 are supplied to the probability ratio sequential detector 13, rather than directly to the radar display device 16, and the gate circuit is subject to being rendered non-transmissive by signals produced by said detector 13, and overload protector circuit 24.

Moreover the intermediate frequency circuits comprehended within block 12 are preferably reduced in bandwidth compared with conventional values, by approximately the same factor by which the transmitted pulses are lengthened over conventional transmitted pulses. This may be accomplished by an I-F filter of entirely conventional design incorporated in the I-F amplifier in the usual manner.

The probability ratio sequential detector 13 processes the signals from circuits 12 in the following way. Let us assume that the radar antenna has just transmitted its first radar pulse at a given effective orientaiton and is now in the process of receiving the radar returns from this transmitted pulse. These radar returns, of course, consist of signals having successive portions corresponding to returns from different ranges, the portions representing returns from close ranges being received first and the portions representing returns from more distant ranges being received later.

These signals are compared within detector 13 of FIGURE 1 with each of two signal threshold values. Any portion of these signals which exceeds the higher of these two threshold values is regarded as a return from a target and an output signal corresponding to that portion is produced at detector output 14. On the other hand, any portion of these signals which falls below the lower of the two threshold values is regarded as a no-target return. If all portions of the returns received during the sweep here under consideration are classified by the detector 13 as either target or no-target indications, then a signal is produced at detector output 15 at the end of that sweep.

In some cases, however, the character of the radar returns from a particular transmitted pulse is such that this classification cannot be made during the particular sweep initiated by that pulse and therefore some portions of the returns during that sweep remain unclassified. In that case, the detector 13 is so conditioned as to store the returns from that particular pulse and combine them with the returns from the next pulse in such a way that the different range representative portions in each set coincide in time. At the same time, either the sensitivity of the detector, or the values of the comparison thresholds, or even both of these parameters, are suitably readjusted. The combined signals are then again compared with the thresholds and the appropriate signals developed at outputs 14 and 15, depending on the outcome of the comparison. If a target or no-target classification is still not possible for every range-representative portion of the sweep, the combining operation is performed again using the returns from the next following sweep, and so on successively. On the other hand, as soon as the comparisons between the radar returns and the threshold values produce an indication that, for every range-representative portion, the return signals are either above the upper threshold (indicating targets) or below the lower threshold (indicating target absence) then, and only then an output signal is produced at detector terminal 15.

This output signal is supplied to gate circuit 18, which may be of any conventional form responsive to such a signal to become non-transmissive for timing signals supplied to it from circuits 22 and to remain so until restored to signal-transmission condition by a suitable reset signal.

Closing of gate 18 prevents the application of additional timing pulses to modulator control circuit 19 and consequently also prevents the transmission of additional radar pulses from antenna 10.

Gate circuit 18 is reopened—thereby permitting the transmission of radar pulses to recommence—by means of a suitable signal from reset circuit 23, which may take the form of any conventional pulse counting network capable of producing a suitable gate opening pulse. This counting circuit counts those timing pulses from circuits 22 which are applied to the gate circuit 18 and produces an appropriate gate opening pulse each time a number of such timing signals is reached corresponding to the maximum number of radar pulses capable of being emitted at a given effective antenna orientation. This maximum number is, of course, equal to the quotient of the time required by the radar antenna to scan through the arc subtended by the cross-section of the radar beam, divided by the radar sweep period. In a practical case, as previously indicated, this number is of the order of ten or greater. Due to the effect of the probability ratio sequential detector, the gate circuit 18 will, at most effective antenna orientations, be closed (and the transmission of rader pulses interrupted) after only two or three such pulses. Therefore, in accordance with the invention, the individual transmitted pulses can safely be greatly extended in duration without having to reduce their peak power and without exceeding the average power limitations of the source of these pulses. Typically, these pulses may be made four times longer than normal, thus occupying about one two hundred fiftieth of a sweep period rather than the typical one thousandths.

The overload protector 24 may comprise a circuit of conventional form which detects the average value of the pulses from control circuit 19, over the period defining the thermal time constant of the radar energy source 21. When that detected value exceeds a critical level corresponding to the average power capacity of the source, a gate-closing pulse is supplied to gate 18 which persists until the detected value again falls below the critical level. Thus the energy source 21 is protected from overload. It will be understood that the closing of gate 18 by the protective signal from protector 24 overrides any attempt of the reset pulses from circuit 23 to open said gate at the end of a sweep. Moreover, although gate 18 has been symbolized in a single block, it will be understood that it may actually consist of two gate circuits in series, one of which is actuated between its two possible states solely by the signal from protector 24, while the other is controlled by the signals from output 15 of detector 13 and the reset signals from circuit 23.

The probability ratio sequential detector 13 may take any of several forms. One such form is described and illustrated in the above-referenced application Serial No. 838,087. As fully explained in that application, video signals representing radar returns during successive sweeps are processed by the apparatus disclosed therein to produce a video output representing targets and another signal representing the case where every range-representative portion of the returns from a given antenna orientation has been classified as either a target or a no-target indication.

One of the principal components of the apparatus employed for that purpose is a video signal recirculating system comprising a delay line of such length that the total recirculation time is equal to one sweep interval. By means of this system, which acts essentially as a sweep integrator, the returns from as many successive sweeps are combined as are necessary to accomplish the desired identification of target and no-target portions. The other principal components of the apparatus in question are the threshold comparators to which the signals circulating within the recirculating system are supplied. The apparatus, of course, also includes various auxiliary apparatus, such as limiters, hold circuits, gates, etc., all as fully disclosed in said application Serial No. 838,087.

The detector 13 also requires timing signals, recurrent at the radar PRF frequency, which are evidently readily available from the conventional timing circuits 22 shown in FIGURE 1 of the present application.

In said prior application, which involves a steerable radar antenna, the signal corresponding to the case where every range-representative portion has been classified as either a target or a no-target indication is utilized to advance the radar antenna from its existing orientation to another. In accordance with the present invention that same signal is used directly, or after transformation by conventional means into a suitable gating pulse, to close the gate circuit 18 in FIGURE 1 of the instant application.

In said prior application, means are also provided for terminating the classification process at a given antenna orientation in case this takes longer than the time reasonably available therefor. In applying the detector apparatus of said prior application to the present invention the time for this termination is defined by the time when the antenna, in its normal scanning motion, leaves a particular effective antenna orientation and moves on to the next effective antenna orientation. This is also the time when the reset circuit 23 in applicant's FIGURE 1 puts out its reset signal for application to gate circuit 18. This same reset signal can therefore be used to terminate the classification process within the probability ratio sequential detector. As more fully explained in said prior application, such termination may be accomplished by applying the reset signal to a conventional erase gate circuit included in the video signal recirculating system forming part of the probability ratio sequential detector, as previously noted. This erase gate responds by inhibiting the circulation of the video signal, thereby removing the video information being stored in the form of this circulating signal.

The probability ratio sequential detector disclosed in said prior application processes the radar returns in the analog form in which they are normally received by the radar antenna. However, it is also possible to process these returns in digital form. In fact this may even be preferable from the point of view of such factors as stability, ease of troubleshooting and the like.

Figure 2:
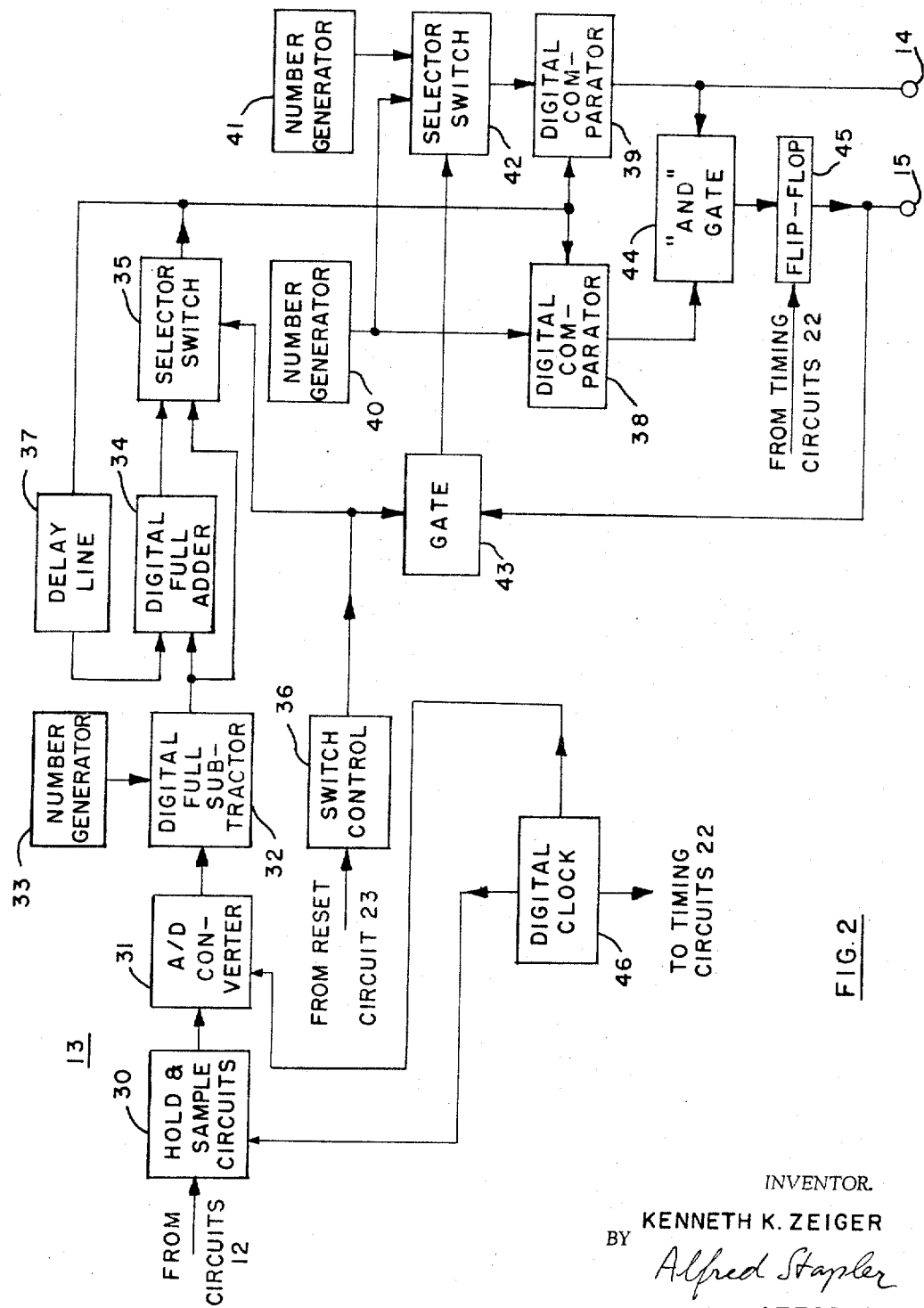
FIGURE 2 shows, also in block diagram form, details of certain portions of the system of FIGURE 1.

The essential elements of apparatus for accomplishing such digital processing are shown in FIGURE 2 of the instant application, to which reference may now be had.

This apparatus includes a hold-and-sample circuit 30 supplied with the video signals from circuitry 12 of FIGURE 1 either directly or after suitable amplification. The output from circuit 30 is supplied to an analog-to-digital, or "A/D" converter 31, whose output is in turn supplied to a digital full subtractor 32, which also receives a signal from a digital number generator 33.

The output from subtractor 32 is supplied to one input of digital full adder 34, whose output is supplied to a selector switch 35 also supplied directly with the output from subtractor 32 and with a signal from switch control circuit 36.

The output from switch 35 is supplied to a delay line 37 by means of which it is fed back to the second input of adder 34. The output from switch 35 is also supplied to each of two digital comparator circuits 38 and 39. Comparator 38 is also supplied with a signal from a digital number generator circuit 40, while comparator 39 also receives a signal from a digital number generator 41 via selector switch 42, which receives a control signal from gate circuit 43. This gate receives signals from switch control circuit 36 and "AND" gate circuit 44 via flip-flop circuit 45.

The apparatus also includes a digital clock signal generator 46 whose outputs are supplied to various other components as hereinafter explained. Exemplary connections from generator 46 to other components are illustrated in FIGURE 2.

The hold-and-sample circuit 30 of FIGURE 2, to which the video radar returns are supplied, operates on these returns to sense their attainment of a maximum value and stretch or "hold" each such maximum until the signal is either sampled or a new higher maximum is reached. This sensing and holding may be accomplished in any conventional manner, as for example, by a diode detector, which is self-biased by a parallel R-C network. The sampling is accomplished by discharging the capacitor of the R-C network at each sampling time by means of a suitable circuit such as a transistor gate circuit. In this way the received video signals are broken up into discrete samples. Each such sample, of course, represents essentially the radar return from a particular range, a sample taken soon after the end of the transmitted pulse during a given sweep interval representing the return from a closer range than a sample taken later during the same sweep.

In practice, although the received radar returns form a continuous signal during any given sweep, the radar is able to resolve only targets differing from each other in range by finite distances. Therefore only a finite number of separate range elements or "range bins" are represented by the continuous returns. By sampling these returns often enough to obtain a number of samples equal to this finite number of range bins, all of the range resolution capable of being provided by the radar system is obtained even though the continuous signal is broken up into discrete portions by the sampling operation.

Each signal sample from hold-and-sample circuits 30 is transformed into a corresponding binary signal in A/D converter 31. This converter may take any known, conventional form capable of producing such a digital signal. Preferably the converter 31 produces 6-bit "words" in response to each sample. However, the quantizer which normally forms part of such a converter is preferably so limited as to be capable of producing, in response to the applied samples from circuits 30, only eight different quantizing levels. Consequently, the digital signals produced by the converter 31 will be capable of assuming only values from zero to seven. All such numbers can, of course, be indicated by the first three bits of six-bit words and accordingly the final three bits of each word from converter 31 will always be zeros.

These numbers—one for each sample from circuits 30—are supplied to subtracting circuit 32, which is of any conventional form capable of subtracting from each such number the number generated by generator 33, which is also of conventional construction. Subtractor 32 is a "full" subtractor, which means that it subtracts not only individual bits, but does so with carry from one bit to the next within each six-bit number.

A typical number which is generated by generator 33 is four, although this number may vary depending on the operating characteristics of the system and may be selected empirically for any particular system and set of operating conditions.

The numbers produced by subtractor 32, each of which represents the return from one range bin less the number from generator 33, are supplied to adder 34 which may take any conventional form capable of adding that signal to a signal from delay line 37, also with bit-to-bit carry as indicated by the characterization of the adder as "full."

The selector switch 35, to which the outputs of subtractor 32 and adder 34 are both supplied, is of any conventional form capable of transmitting one or the other of these supplied signals, under the control of a signal of suitable form derived from a switch control circuit 36 of conventional construction.

As previously explained with reference to FIGURE 1, the end of each period of effective antenna orientation in a given direction is signaled by the occurrence of a signal from reset circuit 23. It is in response to this signal that the selector switch, under the control of circuit 36, is set to transmit the signals derived directly from subtractor 32 and is kept in that condition for the entire ensuing sweep interval. It is during that sweep interval that the first radar pulse at the new effective antenna orientation is transmitted and the corresponding returns received. Thereafter the switch 35 returns to the condition in which it transmits signals from the adder 34 rather than directly from the subtractor 32. In the interim the returns from the above-mentioned first radar pulse have passed through delay line 37, which may be of any conventional form (e.g. magnetostrictive), capable of delaying the signals supplied thereto by an interval such that returns from equal ranges in successive sweeps arrive simultaneously at the inputs to the adder 34 from subtractor 32 and delay line 37, respectively. Thus, during antenna positioning at any given effective orientation, the combination of adder 34, switch 35 and delay line 37 operates as a sweep integrator.

The output signals from switch 35 are also supplied to each of the two digital comparator circuits 38 and 39, where the numbers which they represent are compared, respectively, with the two numbers representing the upper and lower thresholds used to classify the radar returns into target and no-target categories. Conventional digital number generators 40 and 41 are used to generate these different numbers, or rather 6-bit digital words representing such numbers and timed to recur coincidentally with the 6-bit digital words representing the output signals from switch 35. Generator 40 supplies the number denoting the lower threshold, while generator 41 supplies the number denoting the upper threshold. The comparators 38 and 39 are also of conventional form capable of determining which of the signals supplied thereto represents the greater numerical value. The output from number generator 40 is permanently connected to comparator 38, while either the output from generator 40, or that from generator 41 can be supplied to comparator 39, depending upon the setting of conventional selector switch 42, under the control of signals from gate circuit 43.

Normally, the switch 42 is set to supply the signals from upper threshold generator 41 to comparator 39. Under those conditions, the successive signal words from switch 35, representing the sweep integrated returns from successive range bins in each sweep, are compared one at a time with both the lower threshold (in comparator 38) and the upper threshold (in comparator 39). If any of these words from switch 35 exceeds the upper threshold value, a distinctive signal will be produced at the output of comparator 39, and also at the output terminal 14 of the entire detector 13. This signal denotes a target at the particular range represented by the word in question.

On the other hand, if a word falls below the value of the lower threshold, a distinctive signal will be produced by comparator 38, indicating a no-target classification at that range.

Words which are neither below the lower nor above the upper threshold will produce no signal output from either comparator.

The circuit 44, to which the outputs of both comparators 38 and 39 are connected, may be a conventional "AND" gate circuit responsive to the application of two similar signals to assume one output state and, in response to dissimilar signals, to assume a different output state.

For any range bin in each sweep in which a target or no-target classification has been made, the signals supplied to "AND" gate 44 will be different, while for any range bin in which such a classification has not yet been accomplished, the two signals supplied to the "AND" gate will be similar. Thus the gate will assume one output state for classified range bins and another for unclassified range bins. Attainment of the gate output state corresponding to an unclassified range bin at any time during a sweep sets the flip-flop circuit 45 to a state in which it supplies to terminal 15 of detector 13 a signal such as to maintain gate circuit 18 in FIGURE 1 transmissive for the next following timing pulse from circuits 22, thereby permitting the next succeeding radar pulse to be transmitted. On the other hand, if during an entire sweep the "AND" gate 44 at no time attains its unclassified output state, then the flip-flop circuit 45 remains in a state in which it supplies a gate closing signal to terminal 15 and the transmission of radar pulses at that orientation is thereby terminated.

In any event the flip-flop 45 is set to the latter state (if not already in that state) immediately following the occurrence of each of the sweep timing pulses which are applied from circuitry 22 in FIGURE 1 to the gate 18. This setting of the flip-flop may be accomplished by appropriate pulses from said circuitry 22, e.g. by appropriately delayed pulses derived from those generated for application to gate 18.

It is possible, although rare, that the entire interval during which the antenna remains at a given effective orientation will elapse without a target or no-target classification having been made in every range bin. If that should happen, then, at the end of that orientation interval, the flip-flop 45 will still be in the state corresponding to incomplete classification. The gate circuit 43, of conventional form is responsive to the simultaneous application of a signal from flip-flop 45 representing that state and of a signal from switch control circuit 36 representing the end of said orientation interval to transmit to selector switch 42 a control signal causing that switch to change from its normal setting—in which it transmits signals from generator 41—to a different setting in which it transmits signals from generator 40, instead. This new setting is maintained for the period of one sweep, after which the original setting is restored.

It will be recalled that the output signal from generator 40 represents the lower of the two comparison thresholds.

Since the reason why classification did not take place was that the signals in some range bins had neither fallen below the lower nor exceeded the upper threshold, it follows that this lowering of the upper threshold to the value of the lower will inevitably cause the signals in those unclassified range bins to exceed the new upper threshold, thereby resulting promptly in a classification of the signals in these range bins as targets. Thus, no unclassified range bins remain.

The various timing signals required for the operation of the apparatus shown in FIGURE 2, and particularly for the operation of the sampling circuits comprised within block 30 and the various digital signal generating and processing circuits, may all be derived from conventional digital clock circuitry 46. Since these timing signals are preferably related in their times of occurrence to the timing signals from circuitry 22 in FIGURE 1, the operation of the latter may also be synchronized in conventional manner by the clock circuits 46 of FIGURE 2.

It will be understood that numerous modifications of the embodiments described above are possible without departing from the scope of my inventive concept. Accordingly, I desire that concept to be limited only by the appended claims.

I claim:

1. In a radar system having means for transmitting plural radar pulses at a given effective antenna orientation: probability ratio sequential detector means; means for supplying the returns from each said pulse to said detector means; means for deriving from said detector means a signal indicative of the classification of all said returns at one given orientation as target and no-target returns; means responsive to said derived signal to terminate the transmission of said pulses and means for restarting said transmission upon assumption by said antenna of another effective orientation.

2. In a radar system having an antenna which assumes one effective orientation after another: means for transmitting via said antenna a plurality of radar pulses at each said orientation; means for receiving via said antenna means radar returns from each said transmitted pulse; probability ratio sequential detector means; means coupling said receiving means to said detector means; means for deriving from said detector means a signal indicative of the classification of all said returns at one given orientation as target and no-target returns; means responsive to said derived signal to terminate the transmission of said pulses; and means for restarting said transmission upon assumption by said antenna of another effective orientation.

3. In a radar system having antenna means which periodically assumes different effective orientations: means for transmitting via said antenna means a plurality of abnormally long radar pulses at each said orientation; means for receiving via said antenna means radar returns from each transmitted pulse; probability ratio sequential detector means; means coupling said receiving means to said detector means; means for deriving from said detector means a signal indicative of the classification of all said returns at one given orientation as target and no-target returns; means responsive to said derived signal to terminate the transmission of said pulses; and means for restarting said transmission when said antenna has assumed a different effective orientation.

4. In a radar system having antenna means which assumes different effective orientations during successive intervals: means for transmitting via said antenna means during each said interval a plurality of radar pulses having a predetermined repetition rate; means for receiving via said antenna means radar returns from each said transmitted pulse; probability ratio sequential detector means; means for supplying said returns to said detector means; means for deriving from said detector means a signal indicative of the classification of all said returns from a pulse at a given orientation as target and no-target returns; means responsive to said derived signal to terminate the transmission of said pulses; and means for restarting transmission of said pulses at the beginning of the next said successive interval.

5. The system of claim 4 further characterized in that each said pulse has a duration of the order of one two hundred and fiftieth of the reciprocal of said repetition rate.

6. The system of claim 4 further characterized in that said probability ratio sequential detector means comprises means for comparing said returns with each of two different threshold values.

7. The system of claim 6 further characterized in that said detector means comprises means for classifying any excursion of said returns above the upper of said threshold values as a target return and means for classifying any excursion of said returns below said lower of said threshold values as a no-target return.

8. The system of claim 7 further characterized in that said detector means comprises sweep integrator means for supplying returns from successive ones of said transmitted pulses to said comparing means.

9. In a radar system having antenna means which assumes different effective orientations during successive intervals: means for producing a plurality of periodically recurrent timing pulses during each said interval; means responsive to the application of each said timing pulse to transmit a radar pulse from said antenna; probability ratio sequential detector means; means for supplying the returns from each said transmitted pulse to said detector means; means for deriving from said detector means a signal indicative of the classification of all said returns at one given orientation as target and no-target returns; and means responsive to said derived signal to interrupt the application of said timing pulses to said pulse responsive means.

10. The system of claim 9 further comprising means responsive to the end of each said interval of effective antenna orientation to reinitiate said application of said timing pulses to said pulse responsive means.

11. The system of claim 10 further characterized in that said reinitiating means comprises means for counting the number of said timing pulses and reinitiating said application in response to the occurrence of a predetermined number of said pulses.

12. The system of claim 9 further comprising means for counting the number of said transmitted radar pulses and for interrupting said transmission of pulses when the average power limit of the source of said transmitted pulses has been exceeded.

13. The system of claim 9 further characterized in that said probability ratio sequential detector means employs digital signal processing means for classifying said returns.

14. The method of radar surveillance comprising the steps of: transmitting plural radar pulses at each of a plurality of effective orientations; subjecting the returns from each said pulse to probability ratio sequential detection; driving from said detection an indication of the classification of all said returns at a given orientation as target and no-target returns; terminating the transmission of said pulses at said one orientation in response to said indication; and recommencing the transmission of said pulses at another of said orientations, the time period between terminating and recommencing said transmission being independent of the time of occurrence of said indication.

References Cited by the Examiner
UNITED STATES PATENTS

| 3,145,379 | 8/1964 | Caspers | 343—5 |
| 3,156,914 | 11/1964 | Welti | 343—17.1 |
| 3,171,119 | 2/1965 | Nuese et al. | 343—5 |
| 3,206,747 | 9/1965 | Caspers | 343—7 |

CHESTER L. JUSTUS, *Primary Examiner.*

E. T. CHUNG, P. M. HINDERSTEIN, *Assistant Examiners.*